May 22, 1928.  A. B. CLISSON  1,671,065

MECHANICAL MOVEMENT

Filed Nov. 4, 1922  4 Sheets-Sheet 1

INVENTOR.
Albert B. Clisson
BY
Parsons & Bodell
ATTORNEYS.

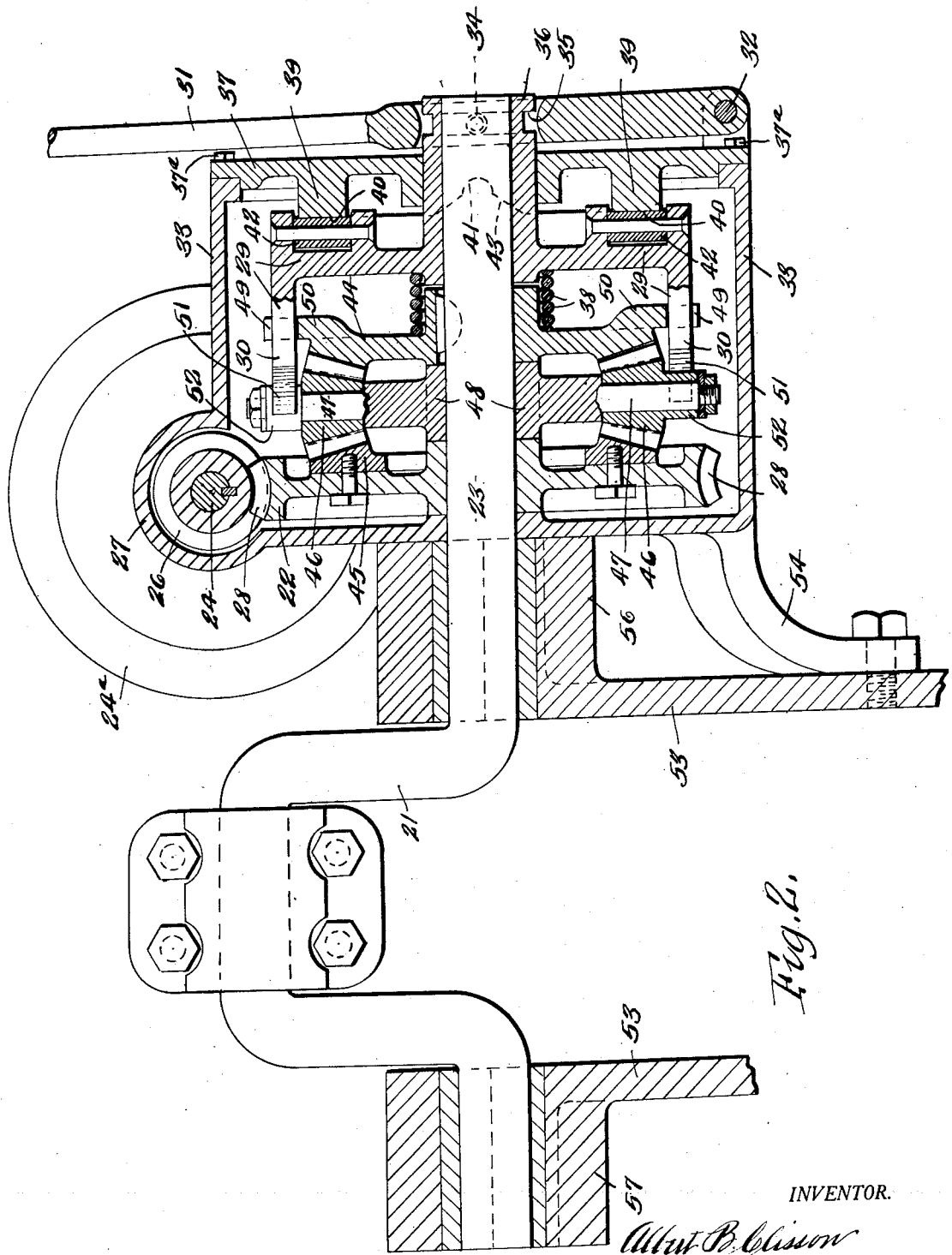

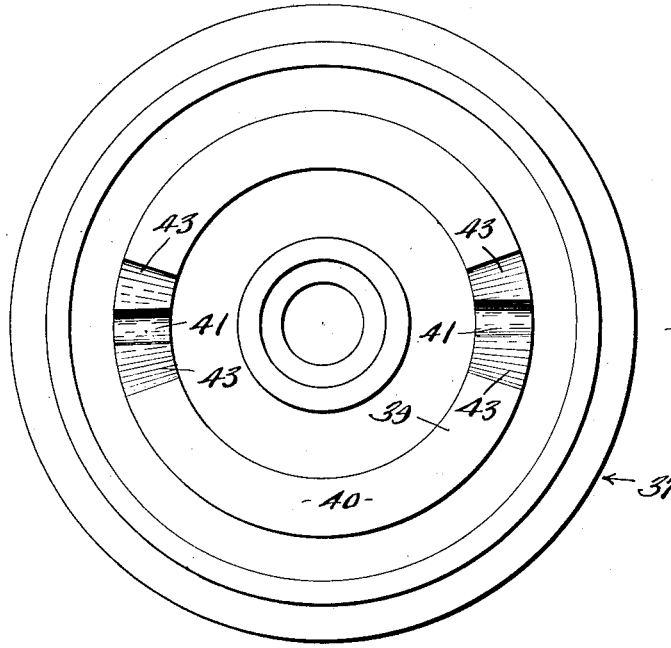
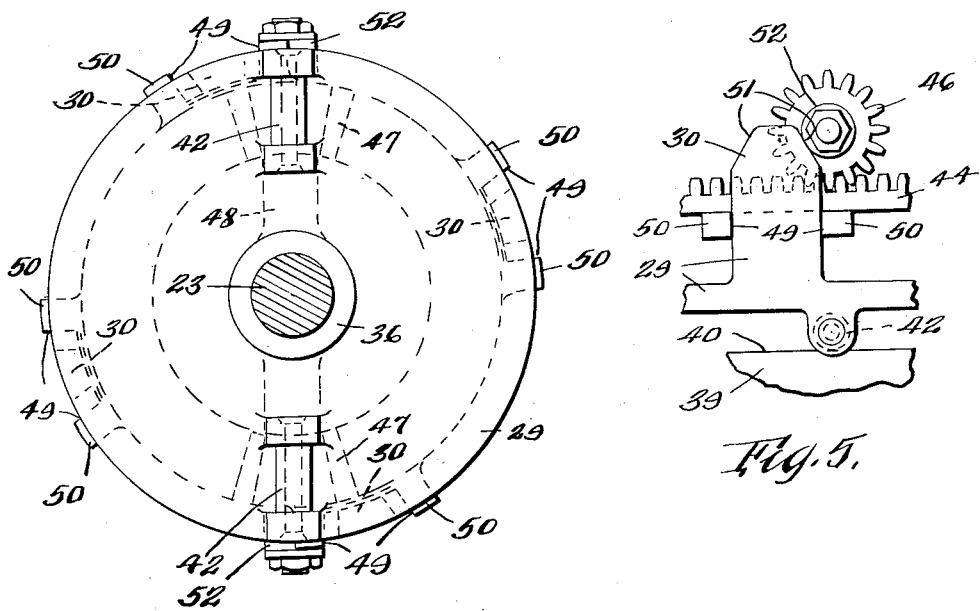

Patented May 22, 1928.

1,671,065

UNITED STATES PATENT OFFICE.

ALBERT B. CLISSON, OF GEDDES, NEW YORK.

MECHANICAL MOVEMENT.

Application filed November 4, 1922. Serial No. 598,966.

This invention relates to mechanical movements, and has for its object a particularly simple and efficient mechanical movement for transferring a constant rotary motion into an intermittent motion and starting and stopping the intermittent motion at predetermined points.

The invention consists in the novel features and in the combinations and constructions hereinafter set forth and claimed.

In describing this invention, reference is had to the accompanying drawings, in which like characters designate corresponding parts in all the views.

Figure 2 is an enlarged sectional view on line 2—2, Fig. 1.

Figure 3 is a face view of the stationary clutch or locking means.

Figure 4 is an elevation of the movable clutch, looking to the left, Fig. 2.

Figure 5 is a fragmentary detail view of the clutch, driven gear, planetary pinion and stationary clutch shown in Fig. 2.

Figure 1:
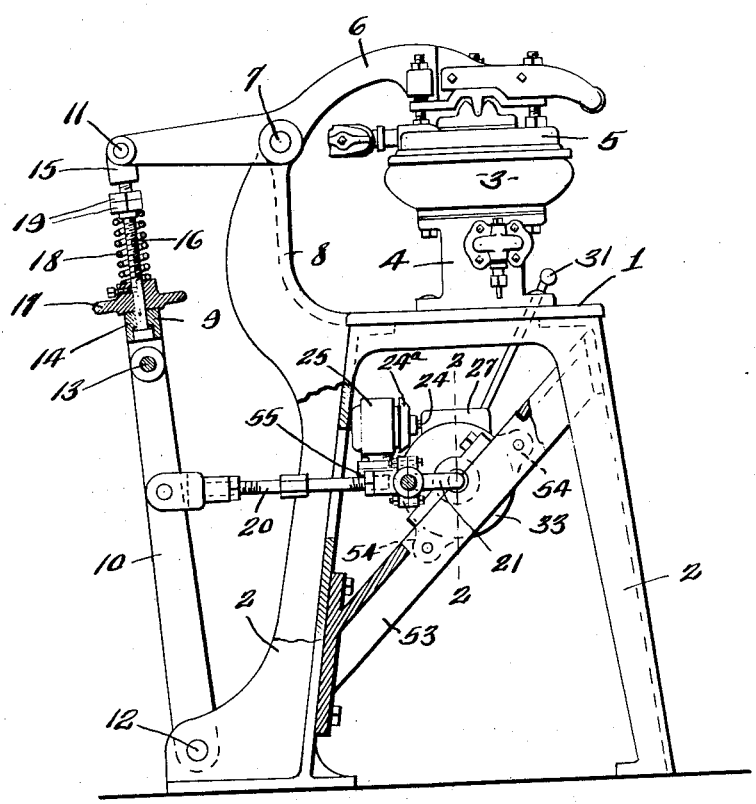
Figure 1 is a side elevation, partly in section, of a machine embodying one form of my mechanical movement.

I have here shown this mechanical movement as applied to a garment or laundry pressing machine, including the usual table 1, supported on legs 2, and a lower buck 3, mounted on the goose-neck or standard 4, which in turn is mounted on the table 1, an upper pressing head 5 carried by a lever frame 6 pivoted at 7 to an upward extension 8 of the table or main frame and operated by toggle links 9 and 10, the link 9 being pivoted at 11 to the rear arm of the lever frame 6 and the link 10 being pivoted at its lower end at 12 to the main frame. The links are pivoted together at 13. The upper link 9 is composed of three main parts, as a clevis 14 pivoted at 13 to the link 10, a clevis 15 pivoted at 11 to the lever 6, a rod 16 threading into the clevis 15 and slidable in the clevis 14, a wheel 17 keyed to the rod to turn the same to thread it more or less into the clevis 15 and hence shorten or lengthen the link 9 and a spring 18 encircling the rod 16 and thrusting against the wheel 17 at one end and against nuts 19 at its other end, which nuts are threaded on the rod 16. Turning of the wheel 17 adjusts the pressing head 5 to the thickness of the articles to be pressed and adjusting of the nuts 19 effects the required tension of the spring 16. The wheel 17 is keyed to the rod 16 by a key as a set screw extending into a lengthwise groove in the rod 16, the groove permitting endwise movement of the rod relatively to the wheel 17.

The toggle links 9, 10, break inwardly toward the frame of the machine and are operated by the mechanical movement to be presently described. They are usually operated through a connecting rod 20 and a crank 21.

It is preferable, in order to effect the pressing, that the crank 21 start and stop in the dead centre line of the connecting rod 20 and crank 21. Heretofore, in machines using a driving element, which starts and stops, it has not been possible to stop the crank and connecting rod in a straight line, as the momentum would carry the crank out of the dead centre line and hence cause the machine to open. By my mechanical movement, a constantly rotating motor, or driving element can be used and the crank stopped at any desired point.

This motion transmitting mechanism comprises a constantly rotating driving element, an intermittently rotatable driven element, a clutch carried by one of said elements and shiftable into and out of operative connection with the other, operator-controlled means for shifting the clutch into operative connection, means, as a spring, tending to shift it out of operative connection, and means for holding the clutch in operative connection and from shifting by the spring until the driven element has moved a predetermined distance about its axis, as for instance, a half revolution.

The driving element, in the illustrated embodiment of my invention, is shown as a wheel 22 and the driven element, as a shaft 23, the wheel 22 being shown as mounted on the shaft to rotate about the same and as being actuated by a constantly running shaft 24, which may be actuated in any suitable manner or from any suitable source of power. As here illustrated, this shaft 24 is an extension of the armature shaft of an electric motor 25 and has a fly wheel 24ᵃ and the motion is transmitted from the shaft 24 to the wheel 22 through a worm 26 mounted on the shaft 24 within a casing 27 and meshing with worm gear teeth 28 on the wheel 22. Also in the illustrated embodiment of my invention, the clutch is shown as rotatable with the driven element 23 and shiftable axially thereof into and out of connection with the driving wheel 22. 29 designates the clutch member which consists of a discoidal carrier mounted on the shaft 23 and having one or more laterally extending arms or jaws 30 which are normally out of connection with the driving wheel 22 and are shiftable into connection therewith, and when connected therewith, cause the shaft 23 to be rotated. This clutch member is normally out of operative connection with the wheel 22 and is shiftable into connection therewith by operator-controlled means here shown as a hand lever 31 pivoted at a fixed point at 32 to a casing 33 enclosing the motion transmitting mechanism and having studs 34 which work in the annular groove 35 of the hub 36 on the clutch 29, this hub extending through the end wall or plate 37 of the casing. The clutch member is moved or returned to its initial or starting position out of operative connection with the wheel 22 by the spring 38.

The means for holding the clutch member 29 in operative connection with the wheel 22 against the action of the spring 38 and for permitting the spring 38 to shift the clutch member 29 out of operative connection with the shaft 24 or the wheel 22 when it is moved about its axis a predetermined amount, as a one-half revolution, comprises what may be termed a stationary cam 39 having a plane face 40 and one or more seats or notches 41 and means as a face on the member 29 for engaging the plane face 40 and for entering the seats or notches 41. The cam 39 as here shown is a ring formed integral with the end plate 37 of the casing and arranged concentric with the shaft 23, and the face or coacting means of the member 29 is here shown as a pair of rollers 42 which ride on the face 40 and enter the seats 41. When the rollers are on the face 40, the member 29 is held in operative connection with the wheel 22, but when these rollers 42 register with the seats 41 the spring 38 is free to act to shift the clutch member 29 to the right, Fig. 2, and out of operative connection with the driving wheel 22.

As the clutch member 29 is locked to the shaft 23, as will be presently described, it locks this shaft 23 from rotation, when the rollers 42 enter the seats 41. Inclined faces 43 lead from the flat, or plane face 40 to the entrances of the seats 41.

In the embodiment of my invention, shown in Fig. 2, the driven element or shaft 23, has a gear 44 keyed thereto and opposed to the gear 45 on the driving wheel 22; planetary pinions 46 mesh with the gears 44, 45, these pinions being mounted on radial studs 47 carried by a carrier 48 mounted or journalled on the shaft 23 between the wheel 22 and the gear 44; and the clutch member 29 operates to receive the planetary motion of the carrier 48 when it is desired to drive the shaft 23 and to free itself of such planetary motion when the shaft 23 is stationary.

The arms 30 of the clutch member 29 as seen in Figs. 2 and 5, extend through slots 49 formed in arms 50 extending radially from the gear 44 and are hence locked to rotate with the gear 44 and the shaft 23. These arms 30, during axial shifting of the clutch member 29 by the lever 31, move into the path of radial projections on the planetary gear carrier 48 and lock the planetary pinion carrier 48 to the gear 44 and shaft 23, so that the planetary pinions 46 are locked from rotation about their own axes and hence the driving gear 22 and the gear 44 of the driven shaft 23 rotate as a unit. However, when the clutch member 29 shifts out of engagement with the pinion carrier 48, and the rollers 42 lock in the seats 41, so that the clutch member 29, gear 44, and shaft 23, are held from rotation, the planetary pinions 46 rotate in their orbits about the shaft 23 and roll along the gear 44 without transmitting any motion to the gear 44 and shaft 23.

As here illustrated, the arms 30 are formed with inclined faces 51, Fig. 5, at their ends which engage axial extensions or hubs 52 of the planetary pinions 46, so that the rotation of these pinions, which is to the left, Fig. 5, tends to thrust the clutch member 29 to the right, Fig. 2, and aid the spring 38 in shifting the clutch member 29 so that the rollers 42 enter the seats 41.

The housing 33 is connected to a brace 53 forming part of the frame of the pressing machine by suitable brackets, as 54, Fig. 2, and also the casing 33 is formed with a suitable bracket 55, Fig. 1, on which the motor 25 is mounted. The brace 53 is of double construction, as shown in Fig. 2, and each side thereof is formed with bearings 56 or 57, and the shaft 23 is journaled in these bearings, the shaft being provided with the crank 21 before referred to, which crank is located between the sides of the brace 53. The rollers 42 and the seats 41 are so located that the rollers enter such seats when the crank 21 and the connecting rod 20 are substantially at their dead centre line, so that a maximum pressure will be applied to the pressing head 5 through the toggle links 9, 10.

Figure 6:
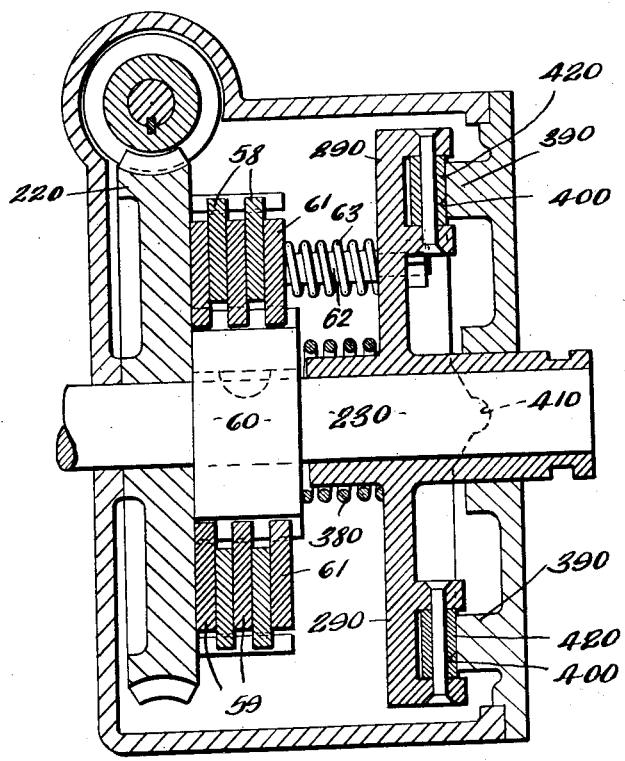
Figure 6 is a view similar to Fig. 2, of another form of this mechanical movement or motion transmitting means.

As shown in Fig. 6, instead of a planetary pinion being used, the driven shaft 230 may be driven at the same speed as the driving wheel 220, instead of thru gearing, as the planetary pinions 46. In Fig. 6, the clutch member 290 is a disk clutch consisting of disks 58 rotatable with the driving wheel 220 and interleaved with disks 59 rotatable with the hub 60 on the driven shaft 230. The clutch member 290 has rollers 420 similar to the rollers 42 of the construction shown in Fig. 2, and coacting with the cam 390 having a plane face 400 and seats 410, similar to the face 40 and seats 41 shown in Figs. 2 and 3. The clutch member 290 is shifted by the operator to the left, Fig. 6, in the same manner as in Fig. 2, against the action of the returning spring 380, but the motion of the clutch member 290 is transferred to the disks 58, 59, through a pressure ring 61, having one or more studs 62 about which are coiled springs 63, interposed between the pressure ring 61 and the body of the clutch member 290. When the clutch 290 is shifted by the operator to the left, Fig. 6, the returning spring 380 is compressed and also the springs 63 are compressed and apply their pressure through the pressure ring 61 to the disks 58, 59, so that the shaft 230 is driven with the wheel 220.

When the shaft 230 has rotated about its axis a predetermined amount, as a one-half revolution, the rollers 420 enter the notches or seats 410 under the pressure of the spring 380 and thus relieve the tension of the springs 63 so that the disks of the clutch disengage.

The parts 42 or 420 are in effect latches movable with driven element 23, or other motion transmitting part acting on the upper press head, which latches are moved into latching position by power, but which when latched hold the press closed.

Figure 7:
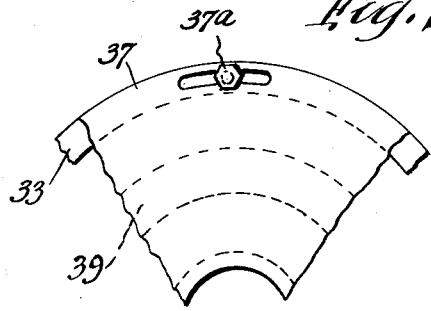
Figure 7 is a fragmentary view illustrating the adjustment of the cam which controls the clutch, in a circumferential direction.

The parts or latches 42 or 420, and the seats 41 or 410, are so located that they will latch when the crank 21 and its pitman or connecting rod are in a straight line. As before stated, the face 40 and seats 41 are formed on a ring carried by the end plate 37. This end plate is detachably secured in position by screws 37ª and is adjustable about the shaft 23 to position the seats 41, when desired, the plate being provided with arc-shaped slots for receiving the screws 37ª as seen in Fig. 7.

In foot presses of this type, the latch for holding the press closed, is carried by a lever which actuates the movable press head and coacts with the main frame, or is carried by the frame and latches onto the lever when the press is fully closed. In the joint applications of applicant and P. N. Braun, Sr. Nos. 573,016 and 580,019, are shown power presses having latches of the type used in the foot presses.

The latch mechanism of this application is particularly advantageous in that it is combined in a compact unit with the clutch mechanism, which connects and disconnects the press head actuating mechanism to and from the constantly rotating power shaft.

In the operation of the pressing machine equipped with my motion transmitting means, the operator arranges the garment on the lower pressing head 3 when the upper pressing head 5 is raised and thereafter actuates the lever 31 to connect the shaft 23 to the constantly rotating driving wheel 22. The actuation of this lever 31 moves the rollers 42 out of the seats 41 and moves the arms 30 into connection with the planetary pinion carrier 48 so that the clutch member being locked to the gear 44 on the shaft 23, such clutch member 29 rotates with the gear carrier 48 and transmits the motion to the gear 44 and shaft 23 and during this time, the rollers 42 are rolling on the plane face 40 of the stationary cam or holder 39. When, however, the shaft 23 has made a half revolution, the rollers 42 again register with the seats 41 so that the spring 38 is free to shift the clutch member 29 to the right and out of connection with the gear carrier 48 so that now the gear carrier rolls planetarily of the gear 44, which is locked from rotation.

This motion transmitting mechanism, when applied to a machine of this character, is particularly advantageous in that owing to the relative arrangement of the locking means for the driven shaft 23 and the crank 21, the shaft 23 can be stopped when the crank and its connecting rod are in a straight line and without jars and jolts, but with maximum pressure.

What I claim is:—

1. A mechanical movement for transferring a constant rotary motion into an intermittent motion comprising a shaft, a wheel rotatable about the shaft and having a gear thereon, a gear rotatable with the shaft, a planetary pinion carrier mounted on the shaft between the gears and rotatable about the shaft, planetary pinions carried by said carrier and meshing with the gears and having portions extending outwardly relatively to the axis of the clutch and rotatable with the pinions, a clutch mounted on the shaft and connected to the gear rotatable with the shaft and having an arm movable into the path of the axial projections on the pinions, said arm being bevelled and means for shifting the clutch to move the arm into the path of the axial projections of said pinions, substantially as and for the purpose described.

2. A mechanical movement for transferring a constant rotary motion into an intermittent motion comprising a shaft, a wheel rotatable about the shaft and having a gear thereon, a gear rotatable with the shaft, a planetary pinion carrier mounted on the shaft between the gears and rotatable about the shaft, planetary pinions carried by said carrier and meshing with the gears and having portions extending radially relatively to the axis of the clutch and rotatable with the pinions, a clutch mounted on the shaft and connected to the gear rotatable with the shaft and having an arm movable into the path of the axial projections on the pinions, said arm being bevelled and means for shifting the clutch to move the arm into the path of the axial projections of said pinions, a stationary clutch arranged concentric with the shaft and having a plane face for coacting with the clutch and a depression for permitting retracting axial movement of the clutch and a spring acting on the clutch to effect such retracting axial movement, substantially as and for the purpose specified.

3. A mechanical movement, comprising a constantly rotating driving element, and an intermittently movable driven element, having a crank associated therewith, a connecting rod mounted at one end on the crank, a pair of toggle links connected to the other end of the connecting rod to be opened and closed thereby, a clutch operable to connect and disconnect the driving and driven elements, latch means operable to hold the driven element in the position in which it is moved by the driving element, when the connecting rod and the crank are approximately in a dead center line, and the toggle links in approximately straightened position, operator controlled means for shifting the clutch into connection with the driving element, and for releasing the latch means, and spring means for shifting the clutch out of operable position and the latch means into latching position.

4. A mechanical movement, comprising a constantly rotating driving element, and an intermittently movable driven element, having a crank associated therewith, a connecting rod mounted at one end on the crank, a pair of toggle links connected to the other end of the connecting rod to be opened and closed thereby, a clutch operable to connect and disconnect the driving and driven elements, latch means operable to hold the driven element in the position in which it is moved by the driving element, when the connecting rod and the crank are approximately in a dead center line, and the toggle links in approximately straightened position, operator controlled means for shifting the clutch into connection with the driving element, and for releasing the latch means, and spring means for shifting the clutch out of operable position and the latch means into latching position, the spring means and the latch means being arranged concentric with the axis of the clutch.

In testimony whereof, I have hereunto signed my name, at Syracuse, in the county of Onondaga, and State of New York, this 27th day of October, 1922.

ALBERT B. CLISSON.